United States Patent
Lim et al.

(10) Patent No.: US 7,639,684 B2
(45) Date of Patent: Dec. 29, 2009

(54) MODIFIED ETHERNET SWITCH

(75) Inventors: Swee Hock Alvin Lim, Singapore (SG); Swetha Subramanian Mathangi, Singapore (SG)

(73) Assignee: Infineon Technologies AG, Munich (DE)

( * ) Notice: Subject to any disclaimer, the term of this patent is extended or adjusted under 35 U.S.C. 154(b) by 571 days.

(21) Appl. No.: 11/021,718

(22) Filed: Dec. 23, 2004

(65) Prior Publication Data
US 2006/0153183 A1  Jul. 13, 2006

(51) Int. Cl.
*H04L 12/56* (2006.01)
(52) U.S. Cl. .................. 370/390; 370/412; 370/428
(58) Field of Classification Search .......... 370/389, 370/386, 360, 379, 395.31, 352, 474, 442, 370/254, 390, 412, 428
See application file for complete search history.

(56) References Cited

U.S. PATENT DOCUMENTS

| | | | | |
|---|---|---|---|---|
| 5,926,472 | A * | 7/1999 | Byers | 370/360 |
| 5,926,473 | A * | 7/1999 | Gridley | 370/389 |
| 6,029,203 | A * | 2/2000 | Bhatia et al. | 709/244 |
| 6,118,768 | A * | 9/2000 | Bhatia et al. | 370/254 |
| 6,246,690 | B1 * | 6/2001 | DiPlacido et al. | 370/408 |
| 6,249,528 | B1 * | 6/2001 | Kothary | 370/466 |
| 6,259,704 | B1 * | 7/2001 | Asahina et al. | 370/460 |
| 6,393,457 | B1 * | 5/2002 | Allison et al. | 709/201 |
| 7,382,789 | B2 * | 6/2008 | Yu | 370/401 |
| 7,477,662 | B2 * | 1/2009 | Lim et al. | 370/522 |
| 7,519,737 | B2 * | 4/2009 | Naismith et al. | 709/245 |
| 2001/0053149 | A1 * | 12/2001 | Mo et al. | 370/389 |
| 2002/0176426 | A1 | 11/2002 | Asano et al. | |
| 2003/0033030 | A1 * | 2/2003 | Naismith et al. | 700/18 |
| 2003/0043848 | A1 * | 3/2003 | Sonksen | 370/474 |
| 2003/0110344 | A1 * | 6/2003 | Szczepanek et al. | 711/100 |
| 2003/0189922 | A1 * | 10/2003 | Howe | 370/352 |
| 2003/0219029 | A1 * | 11/2003 | Pickett | 370/442 |
| 2004/0165590 | A1 * | 8/2004 | Reiner et al. | 370/392 |
| 2006/0153183 | A1 * | 7/2006 | Lim et al. | 370/389 |
| 2007/0253430 | A1 * | 11/2007 | Minami et al. | 370/395.52 |
| 2008/0267182 | A1 * | 10/2008 | Smiljanic | 370/390 |

FOREIGN PATENT DOCUMENTS

EP        1411662 A2 * 4/2004
WO     WO02086674 A2 * 10/2002

OTHER PUBLICATIONS

Sony Ethernet Switch CXD1700, Rev. A, Dec. 1, 1997.*
MICREL Singhle Chip Fast Ethernet Media Converter with TS-1000 OAM, Rev. 1.0, Aug. 26, 2004.*

* cited by examiner

*Primary Examiner*—Ayaz R Sheikh
*Assistant Examiner*—Salman Ahmed
(74) *Attorney, Agent, or Firm*—Slater & Matsil, L.L.P.

(57) ABSTRACT

There is provided a modified Ethernet switch for directing data packets to and from a plurality of Ethernet ports. The switch is arranged to forward each data packet outgoing to one of the ports to the correct port as determined by an address lookup table. The switch is operable in two modes. In the first mode, the switch is arranged to forward each data packet incoming from one of the ports to its correct destination port as determined by the address lookup table. In the second mode, the switch is arranged to forward each data packet incoming from one of the ports to a processor. The address lookup table is maintained by the switch. The switch comprises a control block for switching the switch between the first mode and the second mode.

15 Claims, 1 Drawing Sheet

MODIFIED ETHERNET SWITCH

TECHNICAL FIELD

The invention relates to the field of Ethernet switches. In particular, the invention relates to an Ethernet switch for routing packets to and from a broadband connection.

BACKGROUND

In an Ethernet network, packets coming in and out of a broadband gateway or bridge need to be properly routed.

One way to achieve this is simply to use an Ethernet switch to direct packets to and from the Ethernet ports. Incoming packets are directed to the correct destination port by the switch according to their Layer 2 (Data Link Layer or Medium Access Control (MAC) Layer) address. This arrangement has the advantage that the processing is simple and takes few cycles, as the switch just directs the packets automatically without processor involvement. However, security may be low as the switch may allow unauthorized packets to be passed from one Ethernet port to the other or elsewhere. The packet content itself is only checked by the higher layer protocol.

An alternative method involves the use of a separate Ethernet controller for each Ethernet port. In that arrangement, incoming packets must be processed by a central processor in order to be directed correctly. Although this arrangement is more secure as the processor has the flexibility to inspect the entire packet, it requires more processing power and time.

SUMMARY OF THE INVENTION

In one aspect, the invention provides a modified Ethernet switch which mitigates or substantially overcomes the problems of prior art arrangements described above.

According to a first aspect of the invention, there is provided an Ethernet switch for directing data packets to and from a plurality of Ethernet ports, the switch maintaining an address lookup table and comprising a control block for switching the switch between a first mode and a second mode, wherein the switch is arranged to forward each data packet outgoing to one of the ports to the correct port as determined by the address lookup table and in the first mode, to forward each data packet incoming from one of the ports to the correct destination as determined by the address lookup table, and in the second mode, to forward each data packet incoming from one of the ports to a processor.

In the first mode, the switch simply forwards incoming data packets to the right destination by performing a lookup in the address lookup table. The address lookup table is preferably implemented in hardware. Therefore the data packets can be dealt with quickly. Outgoing packets are also forwarded by address lookup.

In the second mode, the switch automatically forwards all incoming data packets to a processor. Outgoing packets are still forwarded by address lookup. This is more secure but is also reasonably fast because the switch is performing the lookup, not the processor.

The processor may be arranged to forward the data packet to its correct destination as determined by the content of the data packet.

In the second mode, the switch may be arranged to forward each data packet incoming from one of the ports to the processor via a memory.

The control block allows the Ethernet switch to be switched between the first and second modes. The control block may be operable by a user. It may be appropriate to operate in the first mode when there is no need to process higher layer protocols for security reasons. It may be appropriate to operate in the second mode when higher security is required.

Preferably the address lookup table is a Layer 2 address lookup table. In that case, in the first mode, the switch is arranged to direct each data packet to its correct destination based on the Layer 2 address of the data packet. Thus, the switch simply forwards the data packets to their next destination based on the Layer 2 address. In the second mode, the switch is arranged to direct each outgoing data packet to its correct destination based on the Layer 2 address of the data packet, which means that the data packets can be handled quickly. (Alternatively, the address lookup table may be a Layer 3 lookup table or a lookup table for Layer 2 protocols or, in fact, any other suitable lookup arrangement.)

The Layer 2 address may be termed the Data Link Layer address or the MAC (Medium Access Control) address. The Layer 2 address is simply an indicator of the next destination for the data packet. It does not provide any indication regarding the ultimate destination for the data packet.

In the second mode, the address look up table is enabled. This address table is always needed in order to send the packets to the correct physical address. If the address table is maintained by software, then the processor needs lots of effort to maintain it and use it. Because the proposed switch maintains the lookup table and, in both modes, performs the lookup for outgoing data packets from the processor to determine the appropriate port, the lookup does not need to be performed by a processor. Thus, there is less work for the processor and, even in the second mode, the data packets can be processed quickly.

According to the first aspect of the invention, there is also provided an Ethernet device comprising an Ethernet switch as described above and a processor.

According to a second aspect of the invention, there is also provided an Ethernet switch for directing data packets to and from a plurality of Ethernet ports, the switch maintaining an address lookup table and comprising a control block for switching the switch between a first mode and a second mode, wherein, in the first mode, the switch is arranged to forward data packets to the correct destination as determined by the address lookup table, and in the second mode, the switch is arranged to forward data packets to a processor, the processor being arranged to forward the data packets to the correct destination as determined by the content of the data packet.

In the second aspect, in the first mode, the switch operates like a conventional Ethernet switch. In the second mode, the switch operates like a conventional Ethernet controller. Thus, the first mode may be selected for fast processing but lower security and the second mode may be selected for higher security but slower processing. In the second aspect of the invention, in the second mode, use of the lookup table may be in hardware so as to reduce the work load of the processor.

BRIEF DESCRIPTION OF THE DRAWINGS

An exemplary embodiment of the invention will now be described with reference to the accompanying FIGURE, which is a schematic diagram of the modified Ethernet switch according to an embodiment of the invention.

DETAILED DESCRIPTION OF ILLUSTRATIVE EMBODIMENTS

Figure 1:
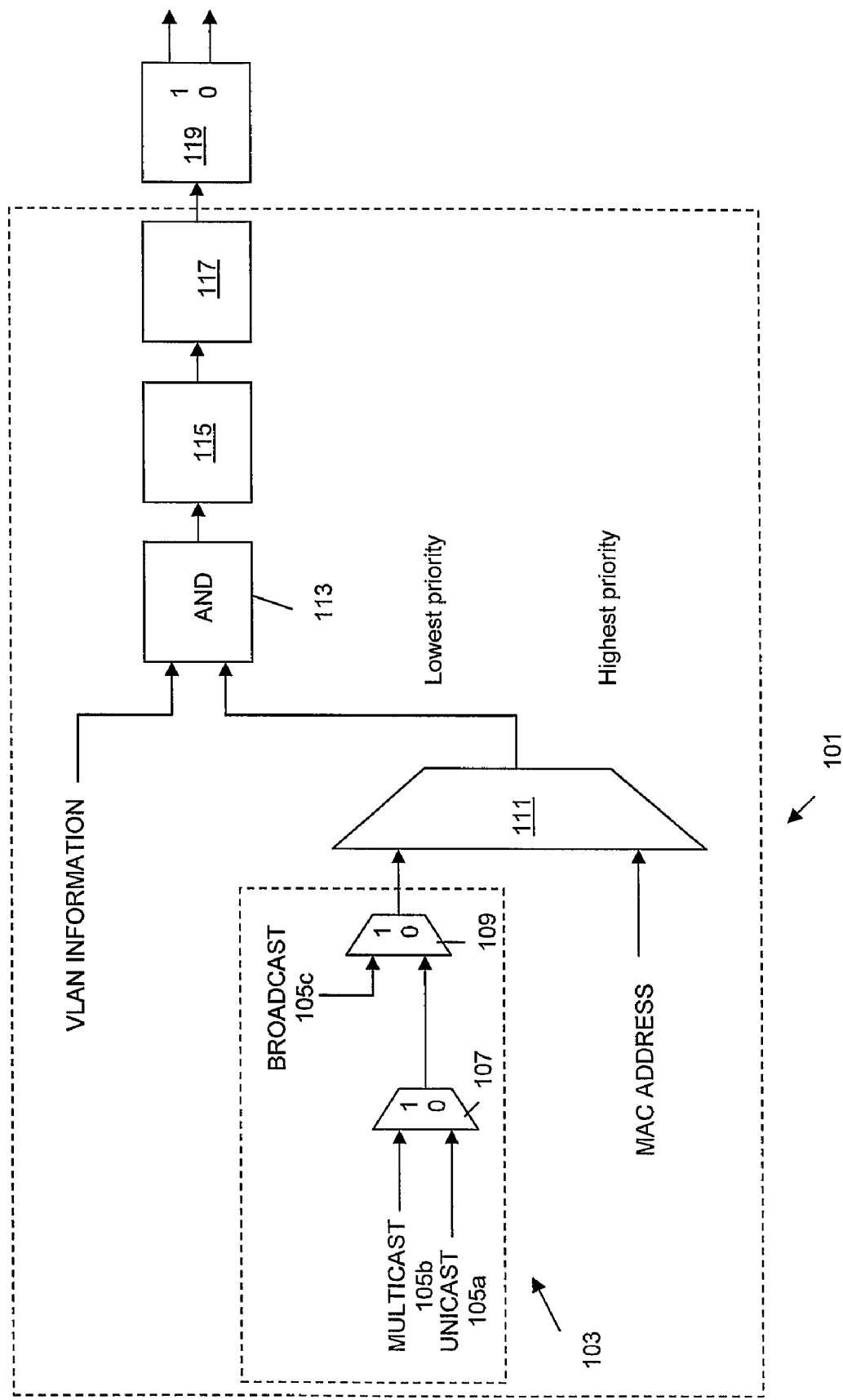

The FIGURE shows a schematic diagram of the modified Ethernet switch according to an embodiment of the invention.

The left hand side of the diagram shows operation of a conventional Ethernet switch 101 and its operation will be briefly summarized.

The incoming packet arrives at 103. A particular incoming packet may be one of several types: a unicast packet 105a (a packet sent from a single sender to a single recipient), a multicast packet 105b (a packet sent from a single sender to a select group of recipients) or a broadcast packet 105c (a packet sent from a single sender to the entire network of recipients). As can be seen by the control logic in buffer 107, a multicast packet takes priority over a unicast packet. Similarly, as can be seen by the control logic in buffer 109, a broadcast packet takes priority over either a multicast or unicast packet. The buffers 107 and 109 will forward the packets according to their priority.

The packet and the packet's Layer 2 (Data Link Layer or MAC Layer) address are input to buffer 111. The packets are stored in buffer 111 and forwarded according to their priority, as determined by the Layer 2 address.

The packet and its Layer 2 address, together with any VLAN (Virtual Local Area Network) information, are forwarded at 113. The VLAN information is additional information inherent in the packet data that is used to further classify packets. The partially processed packet is then filtered in two steps. Firstly, at block 115, the part of the packet relating to the source port is removed. Secondly, at block 117, the switch checks the port bridge status, i.e., if the port is enabled to forward data, and the link status, i.e., if the link up is on the destination port.

As already mentioned, the above described left hand portion 101 of the illustrated arrangement works in the same way as a conventional Ethernet switch. The switch just forwards each incoming packet based on its Layer 2 address. The Ethernet switch does not look at the packet content itself, this waits until higher protocol.

The modification to the switch according to this embodiment of the invention takes place at control block 119, as described below.

If the logic in block 119 is at 0 (i.e., the block is switched off), the control block 119 makes no difference to the switch's operation. So, the switch just operates in the conventional way. That is, the switch just forwards each incoming packet based on its Layer 2 address. As already set out, this process is fast (as the switch just forwards the packets based on Layer 2 address) but it is not very secure (as the packet content itself is not checked).

If, on the other hand, the logic in block 119 is at 1 (i.e., the logic block is switched on), all the incoming packets are automatically directed to the central processor via an external memory to be processed, rather than just being automatically forwarded. The software then processes the whole header information. The central processor looks at the packet content itself and is accordingly directed to the right connection.

Thus, the modified switch has two modes of operation. Firstly, when the logic at block 119 is set to zero, the modified Ethernet switch operates in the conventional way. Incoming packets are forwarded based on their MAC Address. However, the arrangement is not very secure, so operation in this mode is sometimes known as de-militarized operation.

Alternatively, when the logic at block 119 is set to one, the modified Ethernet switch operates under militarized operation. Incoming packets are automatically forwarded to the processor via an external memory. The processing is quite a slow operation compared with the automated hardware lookup of the first mode. However, it is more secure.

Because the switch itself maintains the lookup table for outgoing packets in both modes, the code size and the complexity of the software can be reduced. There is also flexibility to allow the lookup table to be totally disabled thereby making the arrangement operate like an Ethernet controller. That is, in the second mode, there is the ability to use or not use the address lookup table to assist the processor to direct the data packets to the correct destination, in addition to packet filtering done by the processor.

What is claimed is:

1. An Ethernet switch for directing data packets to and from a plurality of Ethernet ports, the switch comprising:
    a first buffer configured to receive unicast packets and multicast packets, the first buffer having control logic that gives priority to the multicast packets over the unicast packets;
    a second buffer configured to receive packets from the first buffer and broadcast packets, the second buffer having control logic that gives priority to the broadcast packets over packets from the first buffer;
    a third buffer configured to receive packets from the second buffer and an address of the packets;
    a source removal block configured to remove a part of the packets that relates to a source port;
    a status check block configured to determine a port bridge status and a link status;
    an address lookup table; and
    a control block, wherein the switch is arranged:
        to forward each data packet incoming from one of the ports to a correct port as determined by the address lookup table if the control block is set to a first logic state, and
        to forward each data packet incoming from one of the ports to a processor if the control block is set to a second logic state, the second logic state different from the first logic state, wherein the processor is arranged to forward each data packet to a correct destination as determined by content of the data packet.

2. The Ethernet switch of claim 1 wherein the control block is operable by a user.

3. The Ethernet switch of claim 1 wherein the address lookup table is a Layer 2 address lookup table.

4. The Ethernet switch of claim 1 wherein the address lookup table is implemented in hardware.

5. An Ethernet device comprising the Ethernet switch of claim 1 and the processor, the processor being coupled to the Ethernet switch.

6. An Ethernet switch for directing data packets to and from a plurality of Ethernet ports, the switch comprising:
    a first buffer configured to receive unicast packets and multicast packets, the first buffer having control logic that gives priority to the multicast packets over the unicast packets;
    a second buffer configured to receive packets from the first buffer and broadcast packets, the second buffer having control logic that gives priority to the broadcast packets over packets from the first buffer;
    a third buffer configured to receive packets from the second buffer and a MAC address of the packets;
    a source removal block configured to remove a part of the packets that relates to a source port;
    a status check block configured to determine a port bridge status and a link status;
    an address lookup table; and
    a control block for switching the switch between a first packet forwarding method and a second packet forwarding method wherein, in the first packet forwarding method, the control block configures the switch to forward data packets to a correct destination as determined by the address lookup table, and in the second packet forwarding method, the control block configures the switch to forward data packets to a processor, the processor being arranged to forward the data packets to a correct destination as determined by content of the data packet, wherein the second forwarding method is different from the first forwarding method.

7. The Ethernet switch of claim 6 wherein the control block is operable by a user.

8. The Ethernet switch of claim 6 wherein the address lookup table comprises a Layer 2 address lookup table.

9. The Ethernet switch of claim 6 wherein the address lookup table is implemented in hardware.

10. An Ethernet device comprising the Ethernet switch of claim 6 and the processor, the processor being coupled to the Ethernet switch.

11. An Ethernet switch for directing data packets to and from a plurality of Ethernet ports, the switch comprising:

a first buffer configured to receive unicast packets and multicast packets, the first buffer having control logic that gives priority to the multicast packets over the unicast packets;

a second buffer configured to receive packets from the first buffer and broadcast packets, the second buffer having control logic that gives priority to the broadcast packets over packets from the first buffer;

a third buffer configured to receive packets from the second buffer and a MAC address of the packets;

a source removal block configured to remove a part of the packets that relates to a source port;

a status check block configured to determine a port bridge status and a link status;

an address lookup table;

means for forwarding data packets to a correct destination as determined by the address lookup table when a control block is set to a first state; and means for forwarding data packets to a processor when the control block is set to a second state, the second state different from the first state, wherein the processor is arranged to forward the data packets to a correct destination as determined by content of the data packet.

12. The Ethernet switch of claim 11 wherein the control block is operable by a user.

13. The Ethernet switch of claim 11 wherein the address lookup table comprises a Layer 2 address lookup table.

14. The Ethernet switch of claim 11 wherein the address lookup table is implemented in hardware.

15. An Ethernet device comprising the Ethernet switch of claim 11 and the processor, the processor being coupled to the Ethernet switch.

* * * * *